United States Patent [19]

Lochmoeller

[11] Patent Number: 5,088,339
[45] Date of Patent: Feb. 18, 1992

[54] LIMIT STOP ASSEMBLY FOR A SCREW AND NUT LINEAR ACTUATOR

[75] Inventor: Stephen A. Lochmoeller, St. Louis, Mo.

[73] Assignee: Roton Products, Inc., Kirkwood, Mo.

[21] Appl. No.: 620,140

[22] Filed: Nov. 30, 1990

[51] Int. Cl.⁵ .......................... F16H 27/02; F16D 7/00
[52] U.S. Cl. ..................... 74/89.15; 192/141
[58] Field of Search ................... 74/89.15, 484.8 R; 192/141

[56] References Cited

U.S. PATENT DOCUMENTS

| | | | |
|---|---|---|---|
| 826,858 | 7/1906 | Jones | 192/141 |
| 2,791,129 | 5/1957 | Russell | 74/424.8 R X |
| 2,979,965 | 4/1961 | Diebold | 74/424.8 R |
| 3,029,660 | 4/1962 | Sears | 74/424.8 R X |
| 3,319,481 | 5/1967 | Goodman | 192/141 X |

Primary Examiner—Allan D. Herrmann
Assistant Examiner—David W. Laub
Attorney, Agent, or Firm—Rogers, Howell & Haferkamp

[57] ABSTRACT

A screw and nut linear actuator has a threaded drive screw. A drive nut is threaded onto the drive screw and is axially translatable thereover by rotating the drive screw relative to the drive nut. The drive nut has a first member translatable along the drive screw upon rotation of the drive screw relative to the first member, and a second member mounted to the first member for rotation relative thereto. The drive screw and first member are allowed to rotate but not translate relative to the second member with the first member restrained from rotation relative to the drive screw. A limit stop is threaded onto the drive screw and is engageable by the first member to restrain rotation of the first member upon engagement by the first member. Engagement of the first member with the limit stop restrains further rotation of the first member thereby restraining further translation of the drive nut while allowing rotation of the drive screw and the first member relative to the second member.

14 Claims, 2 Drawing Sheets

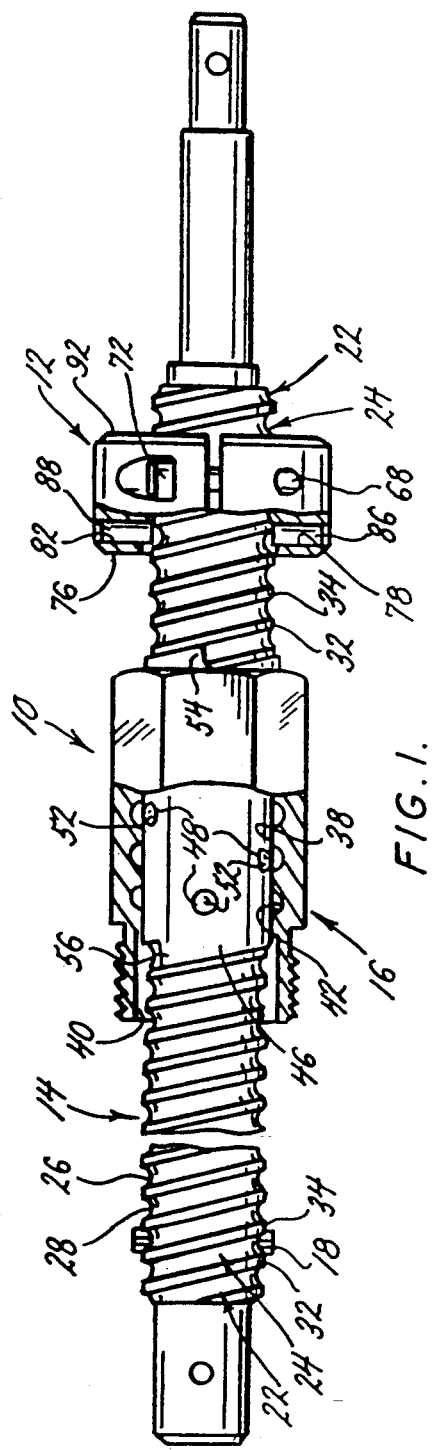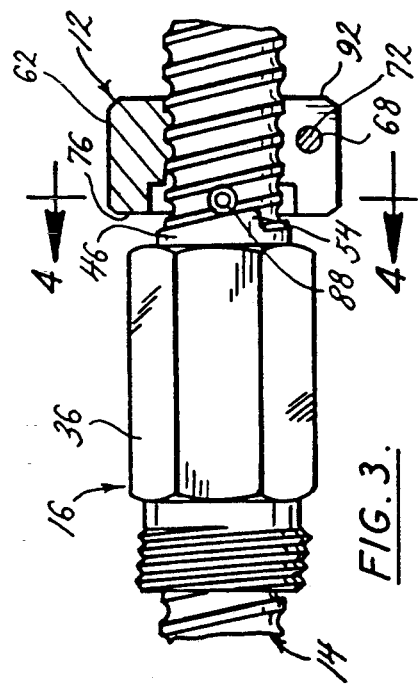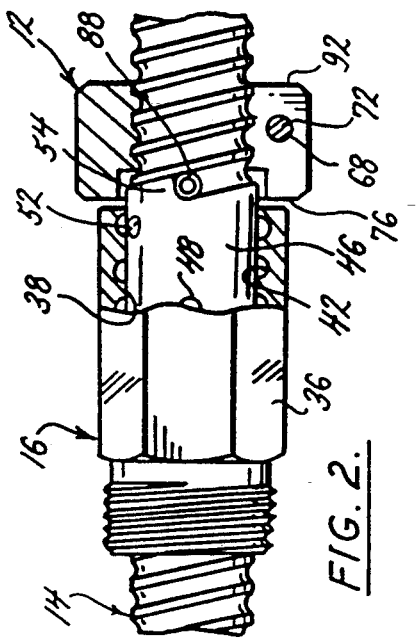

LIMIT STOP ASSEMBLY FOR A SCREW AND NUT LINEAR ACTUATOR

BACKGROUND OF THE INVENTION (1) Field of the Invention

The present invention relates to a limit stop assembly for a screw and nut linear actuator. In particular, the present invention relates to an improved limit stop assembly that is adjustably screw threaded and secured on a drive screw of the actuator apparatus. The improved limit stop assembly limits the motion of a drive nut over the drive screw while preventing frictional binding of the drive nut against the stop assembly.

(2) Description of the Related Art

Screw and nut linear actuator apparatus having a limit stop of the type provided by the present invention commonly comprise a threaded drive screw, a drive nut assembly, and a limit stop assembly. The drive nut assembly is screw threaded on the drive screw and is axially translatable over the drive screw by rotating the nut assembly relative to the screw. The limit stop assembly is releasably secured at a predetermined position on the drive screw, usually at opposite ends of the drive screw.

Prior art limit stop assemblies are commonly comprised of a split collar. A transverse pin projects from an internal annular wall of the collar into the collar center bore. The split collar is secured to a drive screw by inserting the drive screw through the center bore of the collar, and tightening the collar on the drive screw. An example of this type of limit stop assembly is disclosed in the U.S. patent of Thompson, Jr. et al. U.S. Pat. No. 4,804,809.

Prior art drive nut assemblies commonly include a nut body having an axial bore through the body. A plurality of circular grooves are formed in the annular wall of the nut body bore. A cylindrical sleeve is received in the bore of the nut body and retains a plurality of balls in space relation. The balls engage in both the threads of the drive screw and the circular grooves in the nut body. Opposite ends of the sleeve are formed with pairs of shoulders that extend from the ends of the sleeve and are spaced 180° apart on the sleeve ends. The pairs of shoulders also project outwardly from the nut body. A drive nut assembly of this type is also disclosed in the U.S. Pat. of Thompson, Jr. et al. No. 4,804,809.

In use, the prior art drive nut assembly is axially translated fore and aft over the drive screw by rotating the drive screw relative to the drive nut. As the drive nut assembly approaches the prior art limit stop assembly, the sleeve shoulder projecting from the nut body engages the transverse pin of the limit stop assembly at some point as the sleeve of the drive nut assembly is rotated relative to the drive screw. When the sleeve shoulder engages the transverse pin the sleeve is held stationary relative to the drive screw and the nut body is prevented from further axial movement along the drive screw and rotates freely relative to the sleeve and screw.

A disadvantage encountered in prior art screw and nut linear actuator apparatus employing a limit stop assembly of the type described is that the nut body of the drive nut assembly will at times engage against the collar of the limit stop assembly prior to the sleeve shoulder of the nut assembly engaging the stop pin of the limit stop. This is caused by failing to accurately position the pin of the prior art limit stop assembly relative to the drive screw thread. The prior art limit stop assemblies are often secured in an adjusted position on the drive screw without taking care that the stop pin is properly positioned relative to the drive screw thread. This often results in the sleeve shoulder passing by the stop pin as the nut assembly is rotated and translated toward the collar, and the nut body frictionally engaging and binding against the limit stop collar. The frictional binding between the nut body and collar often causes damage to the machine employing the linear actuator apparatus due to the inability of the drive nut assembly to freewheel on the drive screw or to separate from the limit stop assembly.

The screw and nut linear actuator apparatus of the present invention overcomes the above described disadvantages encountered with prior art apparatus by providing an improved limit stop assembly which is threaded onto the drive screw and which has a stop means, the position of which remains constant relative to a drive screw thread regardless of the position of the limit stop along the drive screw. This ensures that the drive nut assembly will engage with the stop means and cause a member of the drive nut assembly to freewheel prior to the member engaging with and binding against the limit stop assembly.

SUMMARY OF THE INVENTION

The screw and nut linear actuator apparatus of the present invention comprises a threaded drive screw, a drive nut assembly, and an improved limit stop assembly. The limit stop assembly is adjustably positioned and secured on the drive screw. As in prior art screw and nut linear actuator apparatus, the drive nut assembly of the present invention is screw threaded on the drive screw and is axially translatable fore and aft over the drive screw by rotating the drive screw relative to the nut.

In one preferred embodiment of the invention, the drive screw is provided with a double screw thread of predetermined pitch. A single screw thread or multiple threads greater than two may also be employed.

Also, in a preferred embodiment of the invention, the drive nut assembly may include a nut body with a center axial bore. Circular grooves are formed in the inner annular wall of the bore. A cylindrical sleeve is received in the bore of the nut body. The sleeve retains a plurality of balls in spaced relation, and the balls engage in the circular grooves of the nut body and the screw thread of the drive screw. Shoulders extend from opposite ends of the sleeve and project from opposite ends of the nut body. Other types of drive nut assemblies may be used with the present invention.

The improved limit stop assembly of the present invention is formed from an annular collar with an axial center bore. Unlike prior art limit stop assemblies, the limit stop assembly of the present invention includes an internal screw thread that mates with the threads of the drive screw. In a preferred embodiment of the invention, a circular cavity is also formed in the annular wall of the collar center bore at an end of the collar that faces the drive nut assembly on the drive screw. Stop means which may be in the form of a pin project into the collar center bore from the annular wall of the circular cavity. The position of stop means relative to a drive screw thread remains constant regardless of the position of the limit stop along the drive screw. In a preferred embodiment of the invention, the center axis of a projecting pin always generally intersects the center line of a thread groove of the drive screw when the limit stop assembly is adjustably screw threaded on the drive screw. With the projecting pin so located, as the drive nut assembly is axially translated toward the limit stop assembly, the sleeve shoulder of the drive nut assembly will always engage a projecting pin prior to the nut body of the drive nut assembly engaging the collar of the limit stop assembly, thereby preventing frictional binding between the drive nut assembly and the limit stop assembly of the invention.

The improved limit stop assembly of the present invention may also be used at both ends of the drive screw to limit the fore and aft axial translation of the drive nut assembly over the drive screw, while preventing binding between the drive nut assembly and the two limit stop assemblies.

BRIEF DESCRIPTION OF THE DRAWINGS

Further objects and features of the present invention are revealed in the following detailed description of the preferred embodiment of the invention and in the figures wherein:

FIG. 1 is a partially sectioned view of a screw and nut linear actuator apparatus employing the limit stop assembly of the present invention;

FIG. 2 is a segmented partially sectioned view of the limit stop assembly of the invention engaging a sleeve shoulder of a drive nut assembly, causing the drive nut assembly to freewheel;

FIG. 3 is a segmented partially sectioned view of the limit stop assembly of the invention prior to engagement of a shoulder sleeve of a drive nut assembly with the limit stop assembly;

DESCRIPTION OF THE PREFERRED EMBODIMENT

Figure 5:
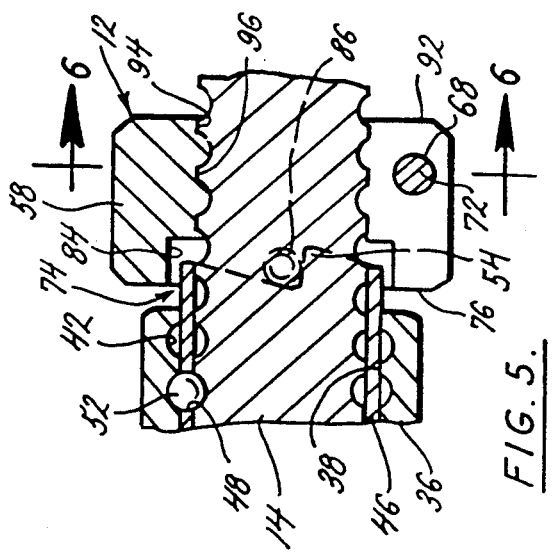
FIG. 5 is a segmented detailed view in section of the limit stop assembly of the present invention fully engaging a sleeve shoulder of a drive nut assembly.
Figure 6:
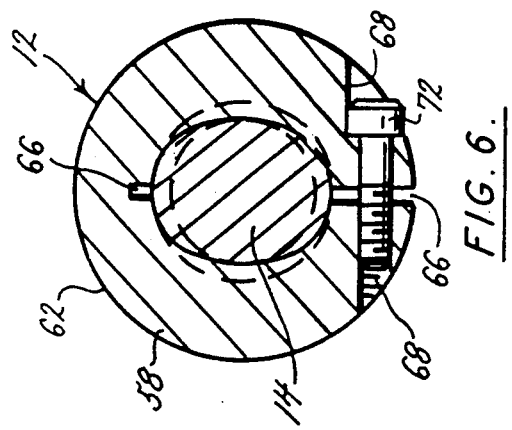
FIG. 6 is an end view in section of the limit stop assembly of the invention taken along the line 6—6 of FIG. 5.

FIG. 1 shows a screw and nut linear actuator apparatus 10 employing the limit stop assembly 12 of the present invention. The screw and nut linear actuator apparatus also comprises a threaded drive screw 14 and a drive nut assembly 16. The drive nut assembly is screw threaded on the drive screw and is axially translatable fore and aft over the drive screw by rotating the drive screw relative to the drive nut. The axial translation of the drive nut assembly over the drive screw to the right as viewed in FIG. 1 is limited by the limit stop assembly 12 secured on the drive screw. The axial translation of the drive nut assembly to the left as viewed in FIG. 1 is limited by a pin 18 press fit in a hole extending transversely through the drive screw. While the pin 18 is shown, it should be understood that a limit stop assembly 12 may also be adjustably positioned on the left end of the drive screw 14 in lieu of the pin 18 if so desired. In many applications of the limit stop assembly 12 of the present invention, a pair of limit stop assemblies will be adjustably positioned and secured on opposite ends of the drive screw.

The drive screw 14 is provided with a double screw thread of predetermined pitch that includes first and second threads 22, 24 that spiral, side by side, over the exterior surface of the drive screw. In alternate embodiments of the invention a single screw thread or multiple threads greater than two may be employed. As is conventional, the threads 22, 24 of the drive screw 14 have thread minor diameters 26, 28 and thread major diameters 32, 34. The thread grooves have center lines at their deepest indentation into the drive screw. The groove center lines spiral along the drive screw and the center lines of the respective thread grooves are separated at axially adjacent points by the pitch of the drive screw.

The drive nut assembly 16 includes a member in the form of a nut body 36 having a center axial bore 38 and a counter bore 40 of somewhat greater diameter than the bore 38. A plurality of circular grooves 42 are formed in the inner annular wall of the bore 38. Another member in the form of a cylindrical sleeve 46 is rotatably received in the center bore 38 of the nut body. A plurality of holes 48 are provided in the sleeve 46. The holes 48 retain a plurality of balls 52 in spaced relation in the sleeve. The balls 52 engage in both the circular grooves 42 of the nut body 36 and the screw threads 22, 24 of the drive screw. Pairs of shoulders 54, 56 extend from opposite right and left ends of the cylindrical sleeve, respectively. The pairs of shoulders project axially outward from opposite ends of the nut body bore 38. The shoulders of each pair are spaced 180° apart from each other. The counter bore 40 allows the end of the drive nut to move past the pin 18 so that the shoulder 56 can engage the pin.

The structure of the threaded drive screw 14 and the drive nut assembly 16 described above is conventional. A drive screw and drive nut assembly of the type described are disclosed in the U.S. Pat. of Thompson, Jr. et al., No. 4,804,809. While the drive screw and nut assembly shown has balls 52, it is to be understood that rollers or the like could also be used. Moreover, it is to be understood that the present invention is not limited to any particular construction of the drive nut assembly. The invention can be used with any drive nut assembly that has a first member translatable along the drive screw upon rotation of the drive screw relative to the first member, and where a second member is mounted to the first member for rotation relative thereto, such that the drive screw and first member are allowed to rotate but not translate relative to the second member with the first member restrained from rotation relative to the drive screw.

The improved limit stop assembly 12 of the present invention is generally an annular collar 58 with a cylindrical exterior surface 62 and a cylindrical axial bore 64 extending through its center. A narrow slit 66 is cut completely through one side of the collar. A partially threaded transverse hole 68 extends through the collar 58 perpendicular to the split 66. A bolt 72 is screw threaded into the threaded hole 68.

Figure 4:
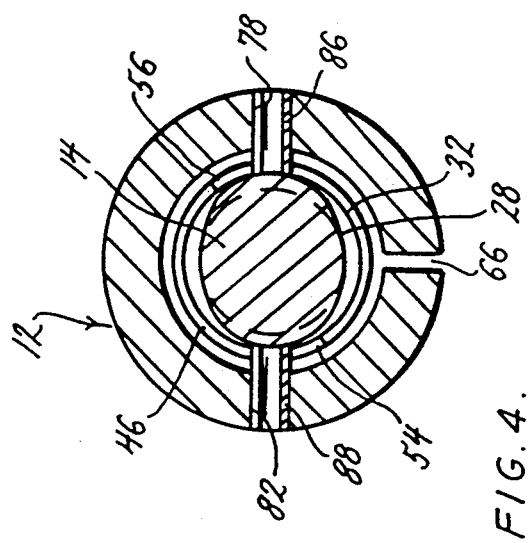
FIG. 4 is an end view in section of the limit stop assembly invention taken along the line 4—4 of FIG. 3.
Figure 7:
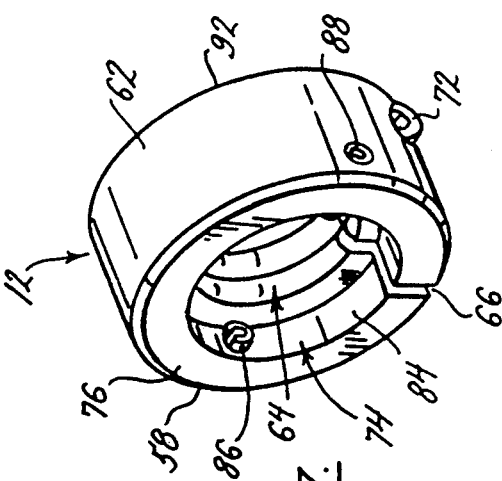
FIG. 7 is a perspective view of the limit stop assembly of the invention removed from the drive screw.

A circular cavity 74 is formed in the left end face 76 of the collar 58 as viewed in FIGS. 1-5. The circular cavity 74 is concentric with the collar center axis and has a diameter slightly larger than the diameter of the cylindrical sleeve 46 of the drive nut assembly 16 to permit the entry of the sleeve shoulders 54, 56 into the cavity.

A pair of mutually opposed pin holes 78, 82 extend through the collar between the exterior surface 62 and an internal annular wall 84 of the circular cavity 74. The pin holes 78, 82 are perpendicular to the center axis of the collar 58. A pair of stop means in the form of pins 86, 88 are press fit in the pin holes 78, 82 and project a short distance into the interior bore 64 of the collar. The extent to which the pins 86, 88 extend into the collar bore is such that the sleeve shoulders 54, 56 will contact the pins when the shoulders are rotated into the circular cavity 74, but the pins will not contact the drive screw threads 22, 24 as the limit stop assembly 12 is adjustably positioned on the drive screw 14 in a manner to be described.

In this described embodiment, the remainder of the annular wall of the collar interior bore 64, between the circular cavity 74 and the right end face 92 of the collar as viewed in FIGS. 1-5, is formed as a double start internal screw thread. The double start internal thread includes first and second internal threads 94, 96 that mate with the threads of the drive screw 14.

Preferably, the positioning of the pins 86, 88 is such that the center axes of the pins approximately intersect the center lines of the thread grooves of the drive screw 14 when the limit stop assembly 12 is screw threaded on the drive screw.

In operation, the limit stop assembly 12 is adjustably screw threaded on the drive screw 14 with the circular cavity 74 of the stop assembly directed toward the drive nut assembly 16 on the screw. The internal screw thread of the limit stop assembly 12 positively locates the center axes of the projecting pins 86, 88 directly above the centers of the drive screw thread grooves 26, 28 for all axially adjusted positions of the stop assembly on the drive screw. When the stop assembly is adjusted to its desired position on the drive screw, the stop assembly 12 is secured to the drive screw 14 by tightening the bolt 72 of the stop assembly. If desired, a second limit stop assembly 12 may be adjustably screw threaded on the opposite end of the drive screw 14 with the circular cavity of the second stop assembly directed toward the drive nut assembly 16. In this described embodiment of the invention, with the pair of projecting pins 86, 88 of the stop assembly located above the centers of adjacent thread grooves 26, 28 of the drive screw 14, as the drive nut assembly 16 is axially translated toward the limit stop assembly the sleeve shoulders 54, 56 will always engage at least one of the projecting pins prior to the nut body 36 of the drive nut assembly engaging the end face 76 of the stop assembly collar, thereby preventing frictional binding engagement between the drive nut assembly and the limit stop assembly.

The improved limit stop assembly of the present invention may also be employed in a screw and nut actuator apparatus having a single threaded drive screw and drive screws having multiple threads greater than two. For example, where a single threaded drive screw is used, the collar of the limit stop assembly will be provided with a single threaded interior bore that, like the first embodiment, positively locates a projecting pin of the stop assembly relative to the thread of the drive screw.

While the present invention has been described by reference to specific embodiments, it should be understood that modifications and variations of the invention may be constructed without departing from the scope of the invention defined in the following claims.

What is claimed is:

1. A screw and nut linear actuator comprising:
   a threaded drive screw;
   a drive nut threaded onto the drive screw and axially translatable thereover by rotating the drive screw relative to the drive nut;
   said drive nut having a first member translatable along said drive screw upon rotation of said drive screw relative to said first member, and a second member mounted to said first member for rotation relative thereto, said drive screw and first member being allowed to rotate but not translate relative to said second member with said first member restrained from rotation relative to said drive screw; and
   a limit stop threaded onto said drive screw and having stop means engageable by said first member to restrain rotation of said first member upon engagement of said first member therewith;
   whereby, engagement of said first member with said stop means restrains further rotation of said first member thereby restraining further translation of said drive nut while allowing rotation of said drive screw and first member relative to said second member.

2. The screw and nut linear actuator of claim 1 wherein the position of said stop means relative to a drive screw thread remains constant regardless of the position of said limit stop along said drive screw.

3. The screw and nut linear actuator of claim 2 wherein said first member has a shoulder at an end thereof for engaging said stop means.

4. The screw and nut linear actuator of claim 3 wherein said second member has an internal axial bore with circular grooves forming an inner annular wall, the first member received in the bore of the second member, said first member retaining a plurality of bearings that engage in the grooves of the axial bore and the thread of the drive screw.

5. In a screw and nut linear actuator of the type having a threaded drive screw and a drive nut threaded onto the drive screw and axially translatable over the drive screw by rotating the drive screw relative to the drive nut, the drive nut having a first member translatable along said drive screw upon rotation of said drive screw relative to said first member, and a second member mounted to said first member for rotation relative thereto, said drive screw and first member being allowed to rotate but not translate relative to said second member with said first member restrained from rotation relative to said drive screw, the improvement comprising:
   a limit stop threaded onto said drive screw and having stop means engageable by said first member to restrain rotation of said first member upon engagement of said first member therewith;
   whereby, engagement of said first member with said stop means restrains further rotation of said first member thereby restraining further translation of said drive nut while allowing rotation of said drive screw and first member relative to said second member.

6. In the screw and nut linear actuator of claim 5 wherein the position of the stop means relative to a drive screw thread remains constant regardless of the position of said limit stop along said drive screw.

7. The screw and nut linear actuator of claim 6 wherein said first member has a shoulder at an end thereof for engaging said stop means.

8. A screw and nut linear actuator apparatus having a binding preventing limit stop, the apparatus comprising:

a threaded drive screw;

a drive nut screw threaded on the drive screw and axially translatable over the drive screw by rotating the drive screw relative to the drive nut; and a limit stop screw threaded on the drive screw, the limit stop having an internal axial bore with an internal screw thread formed therein, the internal screw thread engaging with a thread of the drive screw, and the limit stop having a stop means projecting into the axial bore.

9. The actuator apparatus of claim 8, wherein the drive screw and the limit stop have double screw threads.

10. The actuator apparatus of claim 9 wherein the stop includes first and second pins that project into the axial bore and have colinear axes.

11. The actuator apparatus of claim 8 wherein the limit stop is axially adjustably positioned on the drive screw by rotating the limit stop relative to the drive screw, the drive screw having at least one thread with a thread groove that spirals over the drive screw, the thread groove having a center line that spirals over the drive screw, the stop means comprising a pin, the center axis of the pin approximately intersecting the center line of the thread groove as the limit stop is axially adjustably positioned on the drive screw.

12. In a screw and nut linear actuator apparatus of the type comprising a threaded drive screw and a drive nut screw threaded on the drive screw and axially translatable over the drive screw by rotating the drive screw relative to the drive nut, the drive nut including a nut body having an internal axial bore with circular grooves formed in an inner annular wall of the bore, and a cylindrical sleeve received in the bore of the nut body, the sleeve restraining a plurality of bearings that engage in the grooves of the axial bore and the thread of the drive screw, and the sleeve having a pair of shoulders extending from an end of the sleeve and projecting out from the axial bore at one end of the nut body, the improvement comprising:

a limit stop screw threaded on the drive screw and adapted to be releasably secured to the drive screw in an adjusted position to limit axial translation of the drive nut over the drive screw, the limit stop having an internal axial bore with an internal screw thread, the internal screw thread engaging with a thread of the drive screw, the limit stop having at least one pin projecting into the axial bore, the pin engaging with a shoulder of the drive nut as the drive nut is translated over the drive screw toward the limit stop, the engagement of the pin with the shoulder preventing further translation of the drive nut toward the limit stop and preventing binding of the drive nut against the limit stop.

13. The actuator apparatus of claim 12 wherein the thread of the drive screw includes at least one thread groove that is formed in and spirals over the drive screw, the thread groove having a center line that spirals over the drive screw, a center axis of the pin projecting into the axial bore and approximately intersecting the center line of the thread groove as the limit stop is axially adjustably positioned over the drive screw.

14. The actuator apparatus of claim 12 wherein the drive screw has a double screw thread and the limit stop has a double internal screw thread, the double screw thread of the drive screw including first and second thread grooves formed in and spiraling over the drive screw, the first and second thread grooves having respective first and second center lines that spiral over the drive screw, and the limit stop including first and second pins that project into the axial bore, and center axes of the first and second pins approximately intersecting the respective first and second groove center lines as the limit stop is axially adjustably positioned over the drive screw.

* * * * *